US007013822B2

(12) United States Patent
Gencarelli

(10) Patent No.: US 7,013,822 B2
(45) Date of Patent: Mar. 21, 2006

(54) TOWING SYSTEM

(75) Inventor: Michael Gencarelli, Bellmore, NY (US)

(73) Assignee: Fort Genson Marine, LLC, Lawrence, NY (US)

( * ) Notice: Subject to any disclaimer, the term of this patent is extended or adjusted under 35 U.S.C. 154(b) by 0 days.

(21) Appl. No.: 10/835,625

(22) Filed: Apr. 30, 2004

(65) Prior Publication Data

US 2005/0241560 A1    Nov. 3, 2005

(51) Int. Cl.
    *B63B 21/56*    (2006.01)
(52) U.S. Cl. .................................. 114/249; 280/458
(58) Field of Classification Search ............... 114/242, 114/249, 250, 246; 280/458, 482, 491.1, 280/491.3, 492
    See application file for complete search history.

(56) References Cited

U.S. PATENT DOCUMENTS

| | | | | |
|---|---|---|---|---|
| 1,203,457 | A | * | 10/1916 | Barnard ...................... 280/458 |
| 2,100,612 | A | * | 11/1937 | Potts ........................... 280/401 |
| 2,738,525 | A | | 3/1956 | Roberts |
| 3,035,536 | A | | 5/1962 | Archer |
| 3,353,512 | A | * | 11/1967 | Kawerninski et al. ...... 114/250 |
| 4,116,460 | A | * | 9/1978 | Drower .................... 280/478.1 |
| 4,127,202 | A | | 11/1978 | Jennings et al. |
| 4,249,324 | A | | 2/1981 | Latimer |
| 4,453,487 | A | * | 6/1984 | Vinnari ....................... 114/249 |
| 5,184,563 | A | | 2/1993 | Hislop |
| 5,188,054 | A | | 2/1993 | Jacobs, Jr. |
| 5,387,891 | A | | 2/1995 | Nick |
| 5,715,770 | A | | 2/1998 | Heyworth |
| 6,012,407 | A | | 1/2000 | Farley |
| 6,295,943 | B1 | | 10/2001 | Brushaber |
| 6,474,588 | B1 | | 11/2002 | Valverde |
| 6,766,756 | B1 | | 7/2004 | Cardaci |

FOREIGN PATENT DOCUMENTS

DE    35 31 252 A1 *  3/1987

\* cited by examiner

*Primary Examiner*—Sherman Basinger
(74) *Attorney, Agent, or Firm*—Collard & Roe, P.C.

(57) ABSTRACT

A towing device for towing watercraft comprising a plurality of arms wherein each of these arms has a first end and a second end. There is at least one stabilizing bar coupled to a first end of these arms, and a coupling connection at the second end of these arms wherein this coupling connection is for coupling to a towed watercraft. To control the longitudinal expansion and contraction of this towing device, a plurality of hinge connections are disposed in a coupling connection between these arms in a region where these arms are coupled to each other. These arms are coupled together in a rotatable manner such as in a scissor like connection. At least one of these hinge connections also connect at a center connection point between at least two of these arms. Thus, these arms rotate around these hinge connections to form a towing device that is adjustable in length wherein these arms are collapsible into a storage platform as well.

18 Claims, 8 Drawing Sheets

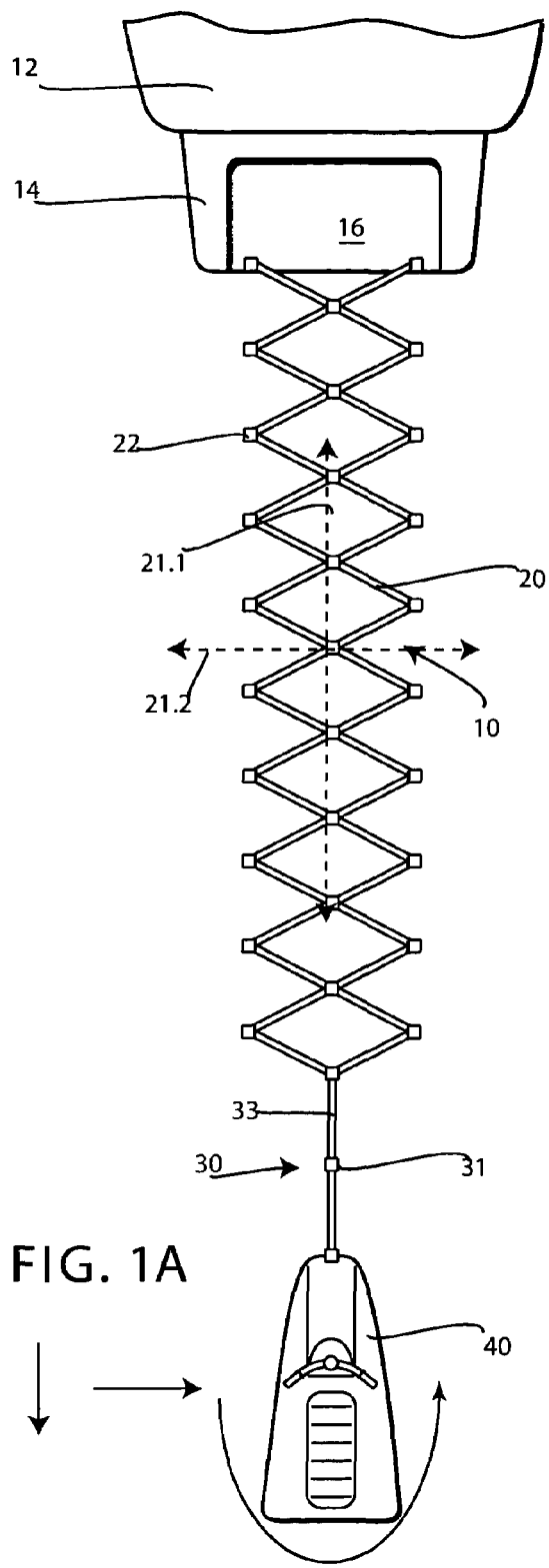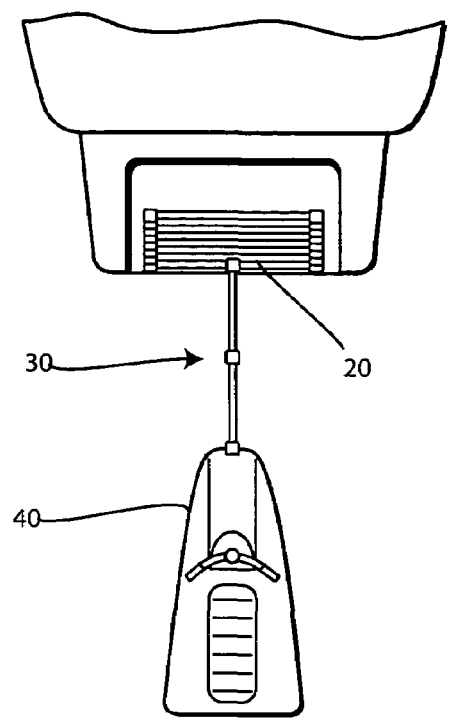
FIG. 1B
FIG. 1A

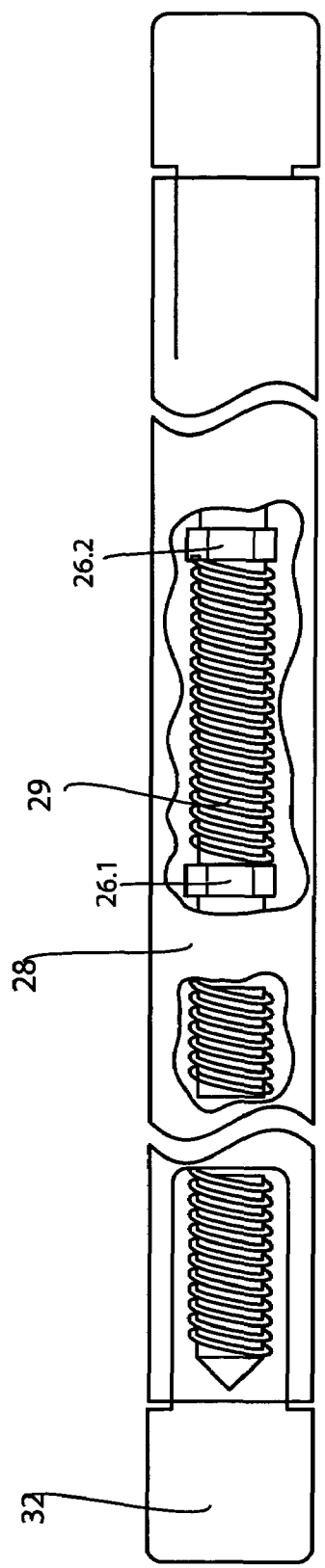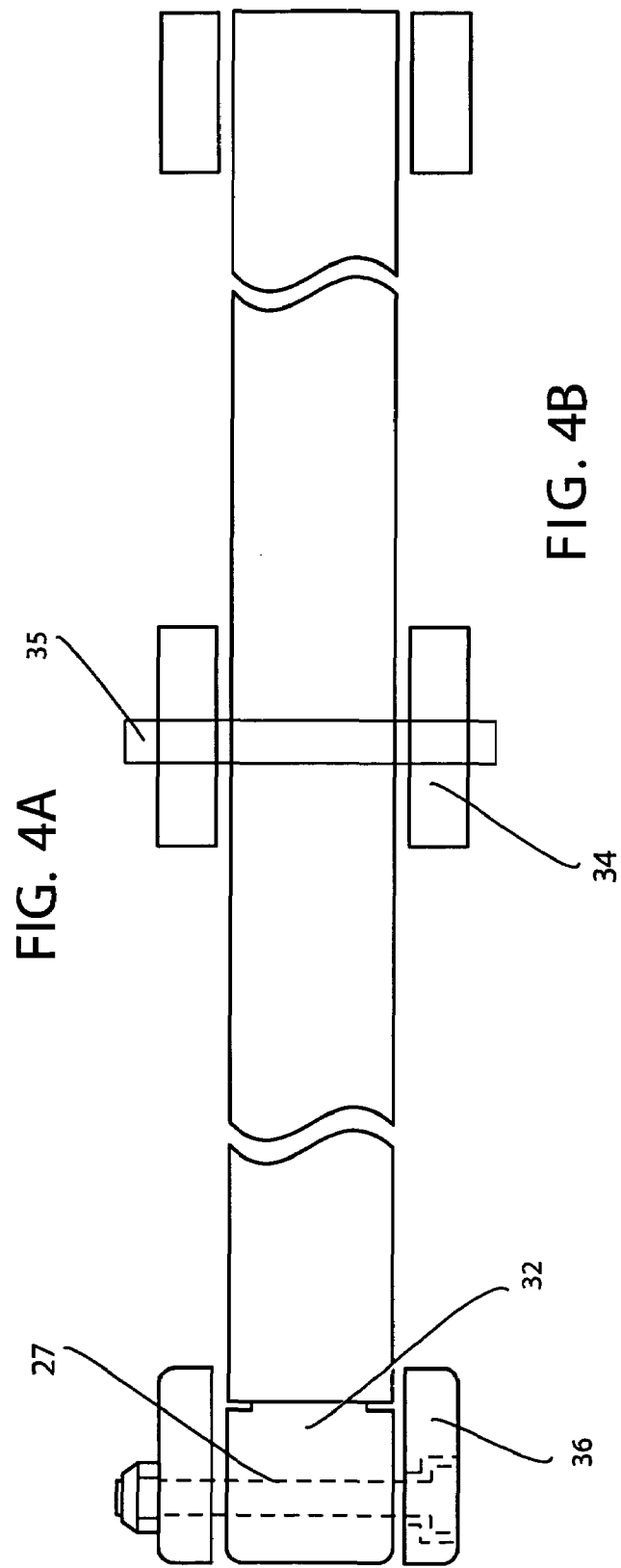
FIG. 4A
FIG. 4B

TOWING SYSTEM

BACKGROUND OF THE INVENTION

1. Field of the Invention

The present invention relates to a towing device that can be used to tow primarily water based craft behind a vessel.

2. The Reference

Other types of towing devices are known. For example, the following U.S. patent Nos. relate to towing devices: U.S. Pat. No. 2,738,525 to Roberts; U.S. Pat. No. 3,035,536 to Archer; U.S. Pat. No. 3,353,512 to Mathews et al; U.S. Pat. No. 5,715,770 to Heyworth; U.S. Pat. No. 5,184,563 to Hislop; U.S. Pat. No. 4,249,324 to Latimer; U.S. Pat. No. 4,127,202 to Jennings et al; U.S. Pat. No. 5,188,054 to Jacobs Jr.; U.S. Pat. No. 6,295,943 to Brushaber; U.S. Pat. No. 5,387,891; U.S. Pat. No. 6,474,588; and U.S. Pat. No. 6,012,407. The present invention is designed to provide several benefits that are an improvement over the above references. Two of the many benefits that the present invention provides are lateral stability along with longitudinal adjustability.

SUMMARY OF THE INVENTION

The invention relates to a towing device for towing watercraft behind vessels comprising a plurality of arms wherein each of these arms has a first end and a second end. There is at least one stabilizing bar coupled to a first end of these arms, and a coupling connection at the second end of these arms wherein this coupling connection is for coupling to a towed vehicle. To control the longitudinal expansion and contraction of this towing device, a plurality of hinge connections are disposed in a coupling connection between these arms in a region where these arms are coupled to each other. These arms are coupled together in a rotatable manner such as in a scissor-like connection. At least one of these hinge connections also connect at a center connection point between at least two of these arms. Thus, these arms rotate around these hinge connections to form a towing device that is adjustable in length. Disposed at each end of the arms can be a coupling head, wherein these coupling heads can be used to form a hinge connection for the arms. There can also be a stabilizer coupled to the stabilizing bar wherein this stabilizer selectively adjusts a position of at least one end of at least two of the arms.

In one embodiment, this stabilizer can be in the form of a spring coupled to the stabilizing bar. In one of these embodiments, this spring is disposed between both ends of the arms as they connect to the stabilizing bar. In an alternative embodiment, the spring can be disposed outside of these ends of the arms. This spring can be in the form of a spiral spring, a leaf spring or gas spring.

Alternatively, the stabilizer can be in the form of a hydraulic stabilizing system, for adjusting a position of each of the two arms on the stabilizing bar. This hydraulic stabilizing system can be incorporated into a hydraulic steering system of a towing vessel.

In another alternative embodiment of the invention, the stabilizer can be in the form of an electrically controlled stabilization system wherein an electric motor would then be used to control the movement of connection blocks along the stabilizing bar.

There can also be a controller system which can be used to control the level of adjustment or stabilization of the arms along the stabilizing bar. In this case, the controller system can include a display for displaying a position of the arms as well as information relating to the speed or drag of the towed vehicle. There is also a controller which is a set of controls such as dials or an input screen to control the stabilizer. These two devices can be in communication with a processor and a memory wherein these two components work in combination to run a program that reports information back to the display and also to take instructions from the controller. In addition, there is a sensor or sensor system which may include a plurality of sensors, wherein this sensor reports diagnostic information or operating information back to the processor and the memory wherein this information is then selectively passed onto the display.

Thus, from this controller system, a user can then control this device by using the controller dials or inputs to select the best distance at which the towed device should be positioned.

Two of the benefits of this system are that this system allows a towing system to be easily controlled in length while offering important lateral stability. Because of the scissor like design of the two sets of arms cris-crossing, these arms, unlike a single rope, cannot be pushed as easily in a lateral direction which is substantially perpendicular to the longitudinal axis of the extension of the towing device. Therefore, a towed vehicle such a personal watercraft would not move laterally out from side to side when being towed, which could result in increased power required to tow a device and also potential damage to the towed device.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 1A shows a top view of the towing device in its expanded form;

FIG. 1B shows a top view of the towing device in its contracted form;

FIG. 4A shows a side view of an arm associated with a first embodiment in FIG. 3A, with this view showing a portion cut away; and FIG. 4B shows a side view of an arm associated with the embodiment of FIG. 3B, with a center bracket and an end coupling shown in dashed lines;

DETAILED DESCRIPTION OF PREFERRED EMBODIMENTS

Figure 2:
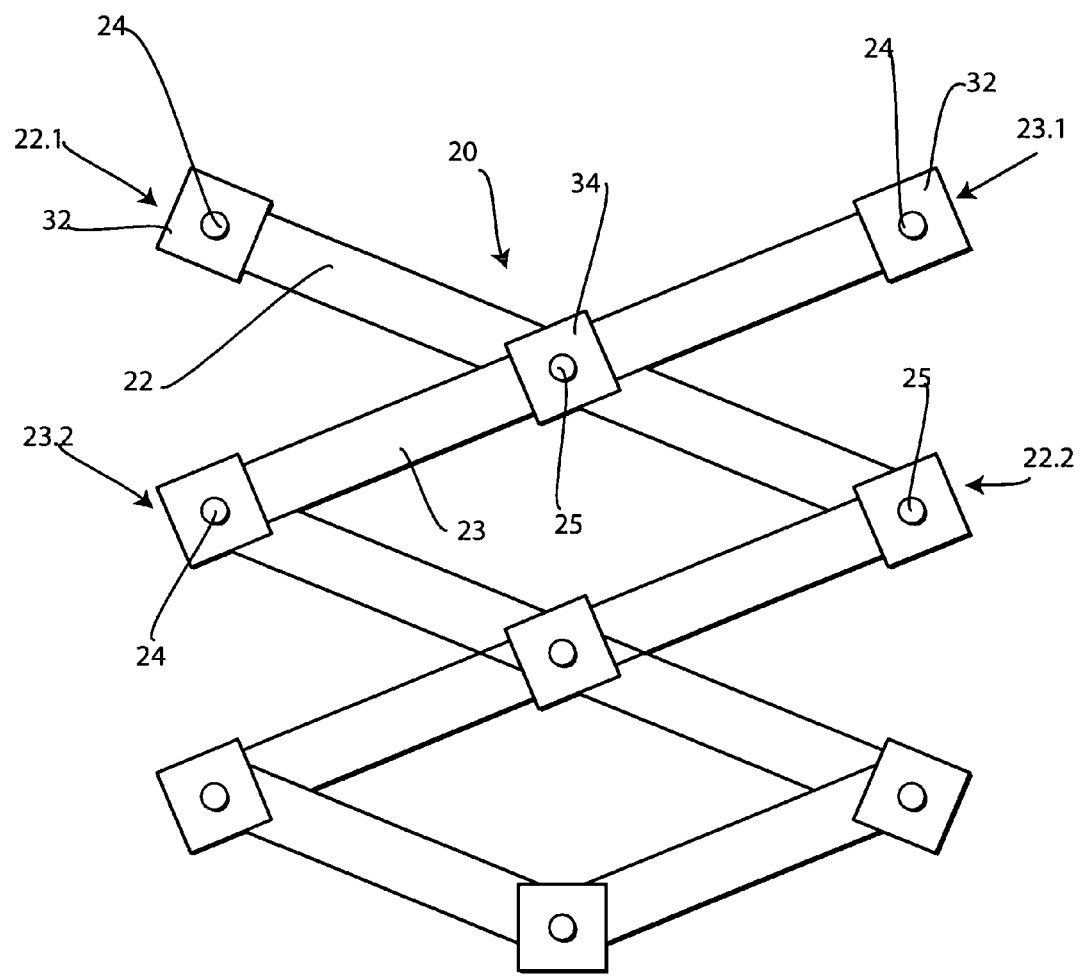
FIG. 2 shows a top view of the section of the towing device shown in FIG. 1.

Referring in detail to the drawings, FIG. 1A shows a top view of the towing device 10 in its expanded state while FIG. 1B shows the towing device in a contracted state. In this view, there is a vessel 12 which contains a back transom or swim platform 14 having a well 16. Coupled to well 16 is the towing device 10 which has an extending or towing section 20 that extends along a longitudinal axis and includes a plurality of arms 22 and 23. A first set of arms 22 and a second set of arms 23 are coupled together in a scissor like manner via hinges 24 and 25, (See FIG. 2) wherein hinges 24 are disposed on ends of arms 22 and 23, while hinges 25 are disposed in a central region of arms 22 and 23. Because the arms are in a scissor like manner, and the ends of these arms are positioned apart from each other on the transom, the device 10 provides increased lateral stability.

For example, if a wave hit a side of the towed device, then that wave would push on the towed device causing a moment force to create a compression force on one side of the towing device and a tension force on an opposite side. However the towed device would remain relatively stable because a connection end of both sets of arms, are secured spaced apart from each other so that the towed device does not move laterally.

Figure 3A:
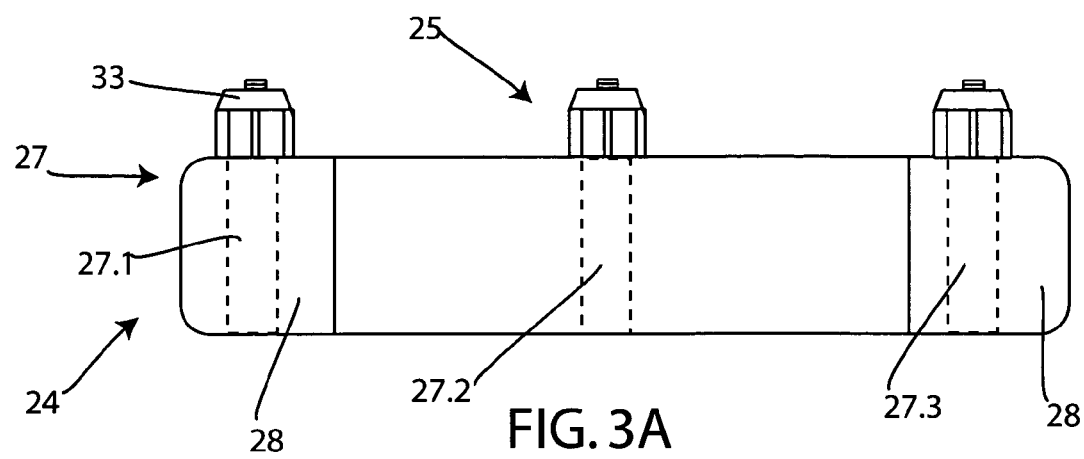
FIG. 3A shows a side view of a section of a first embodiment of the towing device showing at least two arms.
Figure 3B:
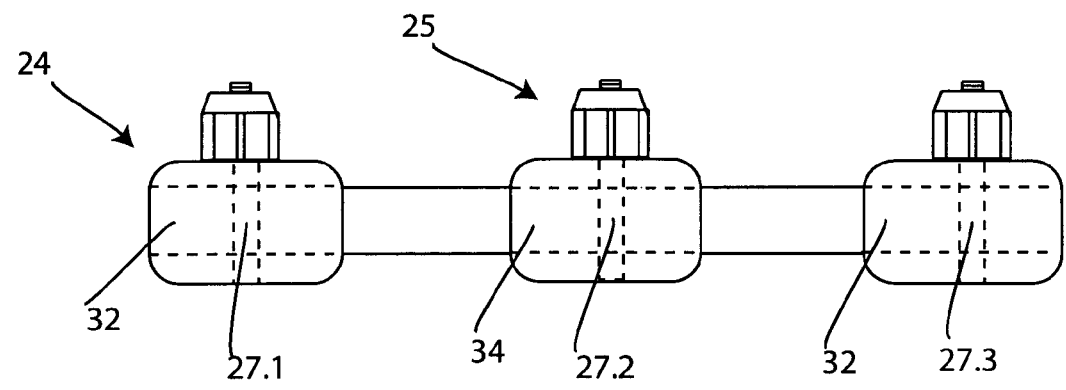
FIG. 3B shows a side view of a section of a second embodiment of the towing device showing at least two arms.

Essentially, the first set of arms 22 are identical or substantially similar to arms 23, however arms 22 are positioned below arms 23. This is shown in FIG. 2. A plurality of bolts 27 fit inside hinges 24 and 25 to secure arms 22 and 23 together. FIG .3A shows bolts 27.1, 27.2, and 27.3 positioned in hinge connections 24 and 25. Hinge connections 24 and 25 are formed from a combination of bolts 27 and sleeves as shown in FIG. 3A, or bolts, and either endcaps 32 or midcaps 34 wherein endcaps 32 are coupled onto a first end 22.1, 23.1 and a second end 22.2, 23.2 of arms 22 and 23 respectively.

As shown in FIG. 1A, a second towing section 30 connects to extendible towing section 20 wherein towing section 30 includes a hinge 31 which allows two different arms 33 to fold up and collapse into well 16. Essentially, as shown in FIG. 1B this towing device can be folded up into a compact position wherein this towing device can be stored in storage container 16. Connected to second towing section 30 is a towed vehicle 40 which can be in the form of a personal watercraft or any other type vessel.

FIG. 4A shows a side view of an arm 22 or 23 which can include an outer shell 28 and an inner screw 29 wherein the outer shell 28 can comprise a resilient material such as carbon fiber, reinforced plastic or fiberglass, or any other type of material while the screw can be in the form of a stainless steel or in the form of carbon fiber, plastic or a fiberglass threaded rod. Coupled to inner screw 29 are a plurality of lug nuts 26 which are screwed onto screw 29. As shown in this view, there are also endcaps 32 and midcaps 34 wherein endcaps 32 can be made from this same reislient material such as carbon fiber or any other type of resilient material known or these endcaps can be made from stainless steel. In this case, endcaps 32 can be threaded wherein they can screw onto ends of screw 29 such that these endcaps 32 form secure ends for outer shell 28. Endcaps 32 can also be secured via an adhesive which bonds an inner region of endcap 32 to an inner region of outer shell 28. If screw 29 is formed from stainless steel, then the shell and endcaps are formed from a non corrosive material that would compensate for the corrosion characteristics of steel in salt water. Thus, the materials in endcaps 32 and cover 28 would be formed from for example fiberglass if screws 29 was formed from stainless steel.

Figure 5A:
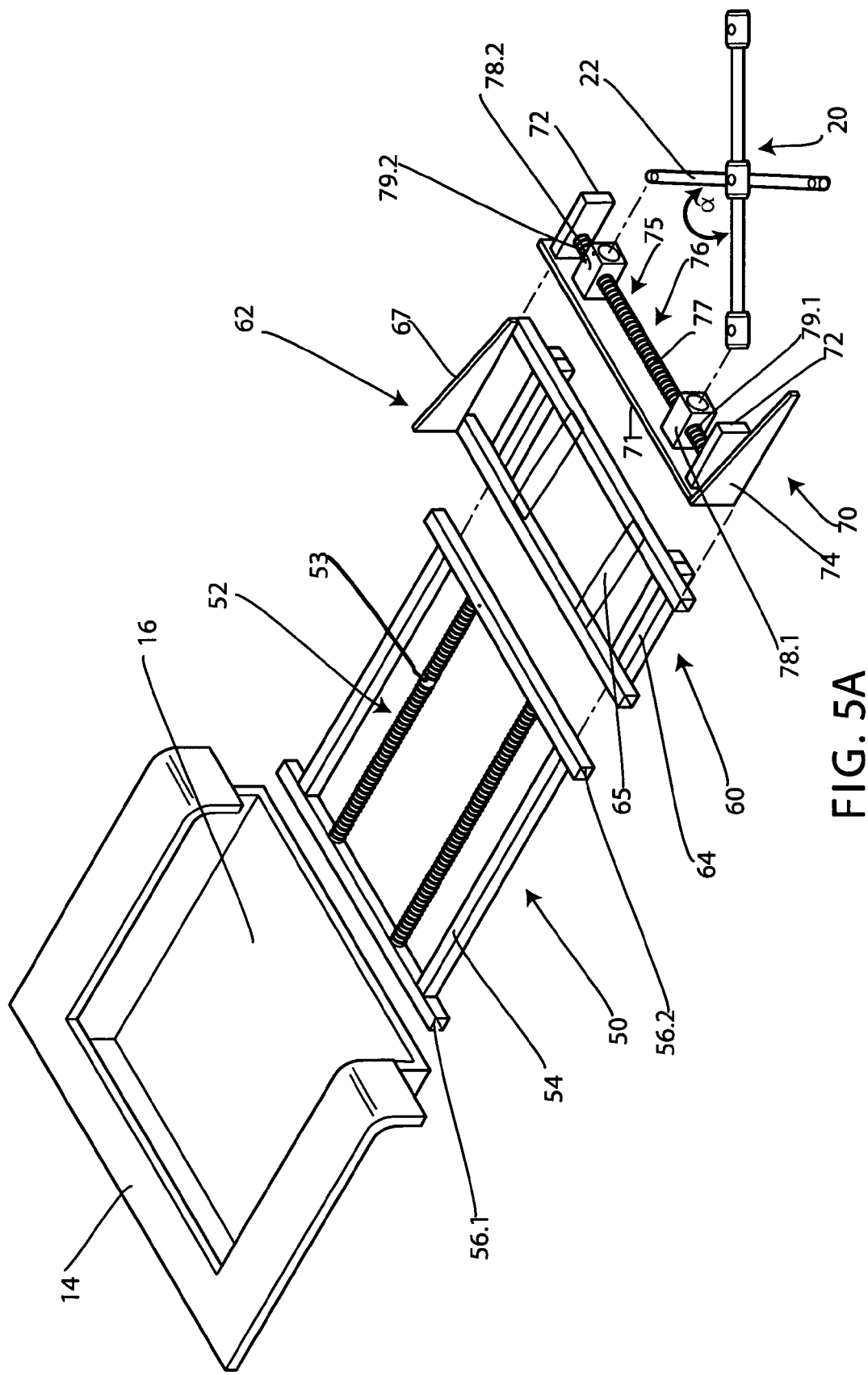
FIG. 5A shows an exploded perspective view of a containment section the towing system.

FIG. 4B shows an alternative embodiment for coupling arms 22 and 23 together. In this design, there is an additional end coupling cap 36 coupled over endcap 32. End coupling cap can be formed from any relatively slippery material such as UHMW plastic. In addition, midcap 34 is disposed in a central region of arms 22 and 23 wherein midcap 34 can also be formed from UHMW plastic. In this case, midcap 34 can be coupled around arms 22 and 23 wherein midcap 34 would also contain a cross-sectional hole for receiving a pin or screw 35 as a hinge connection. As shown in FIG. 5A screw 29 can contain a center screw hole which is designed to receive pin or screw 35 which fits there-through.

FIG. 5A shows a perspective view of a towing delivery system which includes a rail system 50 which comprises rails 52 and 54 wherein rails 52 are controllable rails which can contain springs 53 or any other known adjustment device such as a hydraulic or electronic controller. Outer rails 54 and inner adjustable rails 52 are coupled to end rods 56.1 and 56.2 which form a bracket that fits inside well 16 in transom 14. This bracket can be secured to well 16 via any known attachment means such as glue, screws, brackets, or bolts. A slider system 60 can rest on top of rails 52 and 54 wherein slider system 60 can move from a compact position adjacent to end rod 56.1 to an extended position adjacent to end rod 56.2. Slider system 60 is controlled via adjustable rails 52 which control when and the extent to which slider system 60 slides from end rods 56.1 to rod 56.2.

Slider system comprises a slide bracket 62, slider rails 64, and slider adjusters 65. Slider rails 64 slide on rails 54 while slide adjusters 65 move on inner rails 52. In this case, inner rails 52 include a controlling means or mechanism for controlling the sliding of slider system 60. Connected to slider bracket 62 is a slider flange 67 which provides for additional vertical stabilization inside of storage container 16. Flange 67 is triangular shaped and it extends up to a top region of container 16 so that it provides a controlled slide of slider system 60.

A stabilizing system 70 is coupled to slider bracket 62 at one end. In this case, stabilizing system 70 includes a cross plate 71 and end arms 72. Coupled to end arms 72 is a stabilizer 75. Stabilizer 75 can be in the form of a cross bar 76, and in this view at least one center spring 77. Cross blocks 78.1 and 78.2 are slidably disposed on cross bar 76 and are controlled by either center spring 77 or outer springs 79.1 and 79.2 which are disposed outside of cross blocks 781.2 and 78.2

Extendable towing section 20 can be coupled to cross blocks 78.1 and 78.2 wherein cross blocks 78.1 and 78.2 are movably disposed on cross bar 77 to adjust an angle α which forms the angle of opening for the two arms 22 and 23. If angle α approaches 180 degrees, then the device is in its collapsed position. If angle α approaches 0 degrees wherein blocks 78.1 and 78.2 are disposed adjacent to each other, then the device is in its fully extneded position.

Figure 5B:
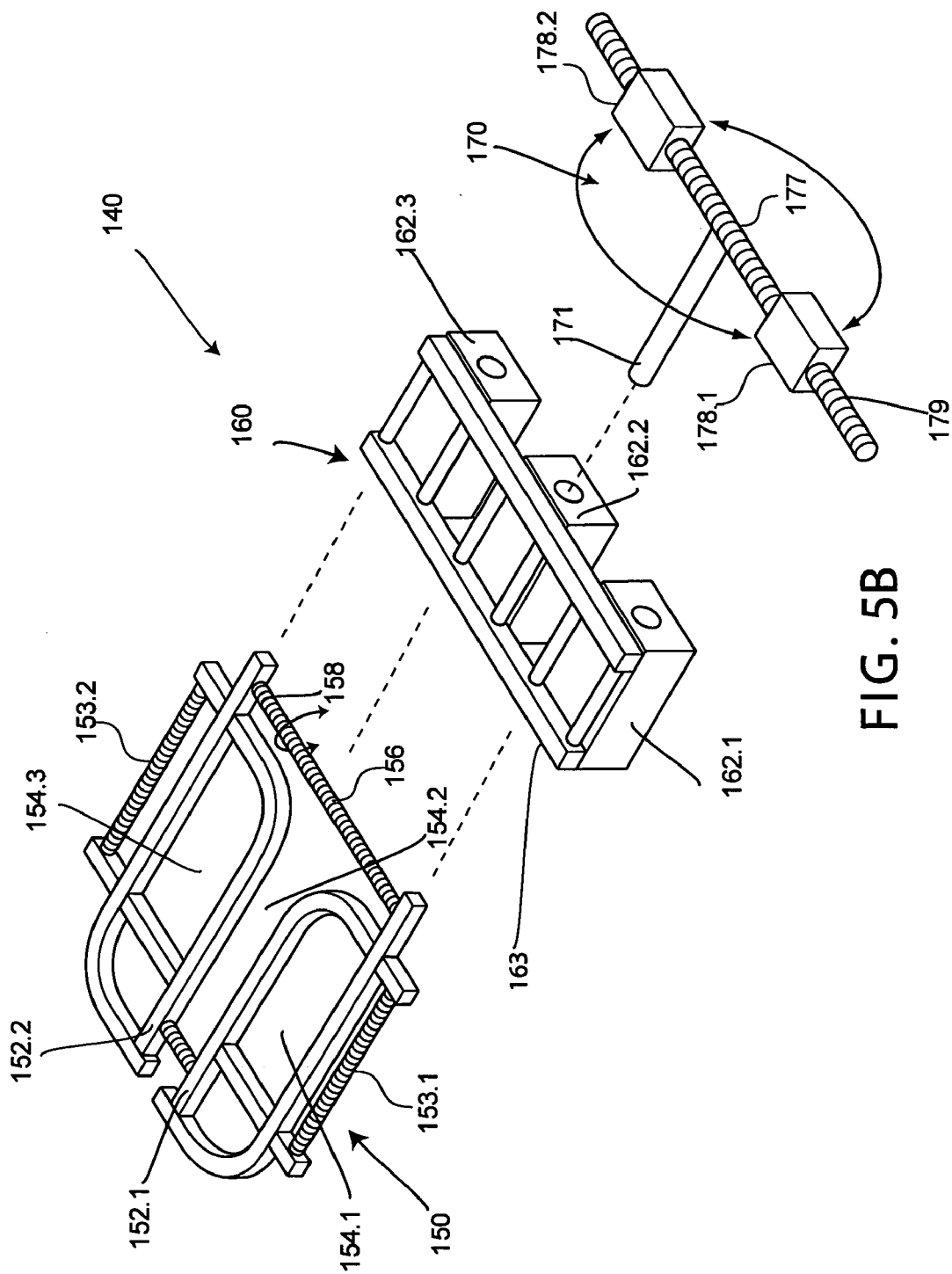
FIG. 5B shows an exploded perspective view of a second embodiment of a containment system for the towing system.

FIG. 5B shows an exploded perspective view of another embodiment of a contianment system 140 wherein in this embodiment, there is a holding device 150 which includes a set of inner brackets 152.1 and 152.2 which forms a plurality of channels 154.1, 154.2, 154.3, a set of outer brakcets 153.1 and 153.2 which are coupled to but disposed outside of inner brackets 152. Outer brackets 153.1 and 153.2 include a spring such as a gas spring wherein these outer brackets are for controlling the release of the towing device.

There is also an end bracket or rod 156 which is coupled to inner brackets 152. A set of bushings 158 which can be similar to bushings 32 or 34, rotate about bracket 156. This containment system 140 would reside inside of platform 16 such that it can be concealed inside of this platform.

There is also a sliding platform 160 which includes a frame 163 and at least three blocks or guides 162.1, 162.2, and 162.3 wherein when the device is in its compact position, block 162.1 fits inside of channel 154.1, block 162.2 fits inside the channel 154.2, and block 162.3 fits inside of channel 154.3.

A connection controller 170 which can be essentially T-shaped is also connected with platform 160 wherein connection controller 170 is in the form of a rod or shaft 171 which can be inserted into block 162.2 wherein block 162.2 has a receiving hole which is adapted to receive shaft 171. There is also a cross-shaft 177 which is coupled to shaft 171 wherein cross shaft 177 includes a spring 179, associated with it. There are also a plurality of selectively adjustable blocks 178.1 and 178.2 which are disposed on cross shaft 171 such that they can be adjusted or movable in a similar manner as cross blocks 78.1 and 78.2.

In operation, sliding platform 160 can be slid out on top of holding device 150 while being selectively controlled by springs 153.1 and 153.2 wherein blocks 162.1 and 162.3 are coupled to springs 153.1. Blocks 162.1 and 162.3 are slidable inside of channels 154.1, 154.2 and 154.3 along a longitudinal axis so that sliding platform can selectively slide towards or away from bracket 156. In this movement, the towing system 20, can be rolled over bushings 158 and distributed out behind a vessel because bushings 158 are coupled to shaft 156 in a rotatable manner, thus providing a relatively easier displacement or release of the device.

Connection controller 170 is coupled to block 162.2 in a rotatable manner wherein connection controller allows the towing system to be rotated in different directions along an axis extending along shaft 171. In this way, when the ends of arms 22 and 23 are coupled to blocks 178.1 and 178.2, they can be rotated about shaft 171 to provide a design which is forgiving or flexible in rotation, while still providing lateral stability.

Figure 6:
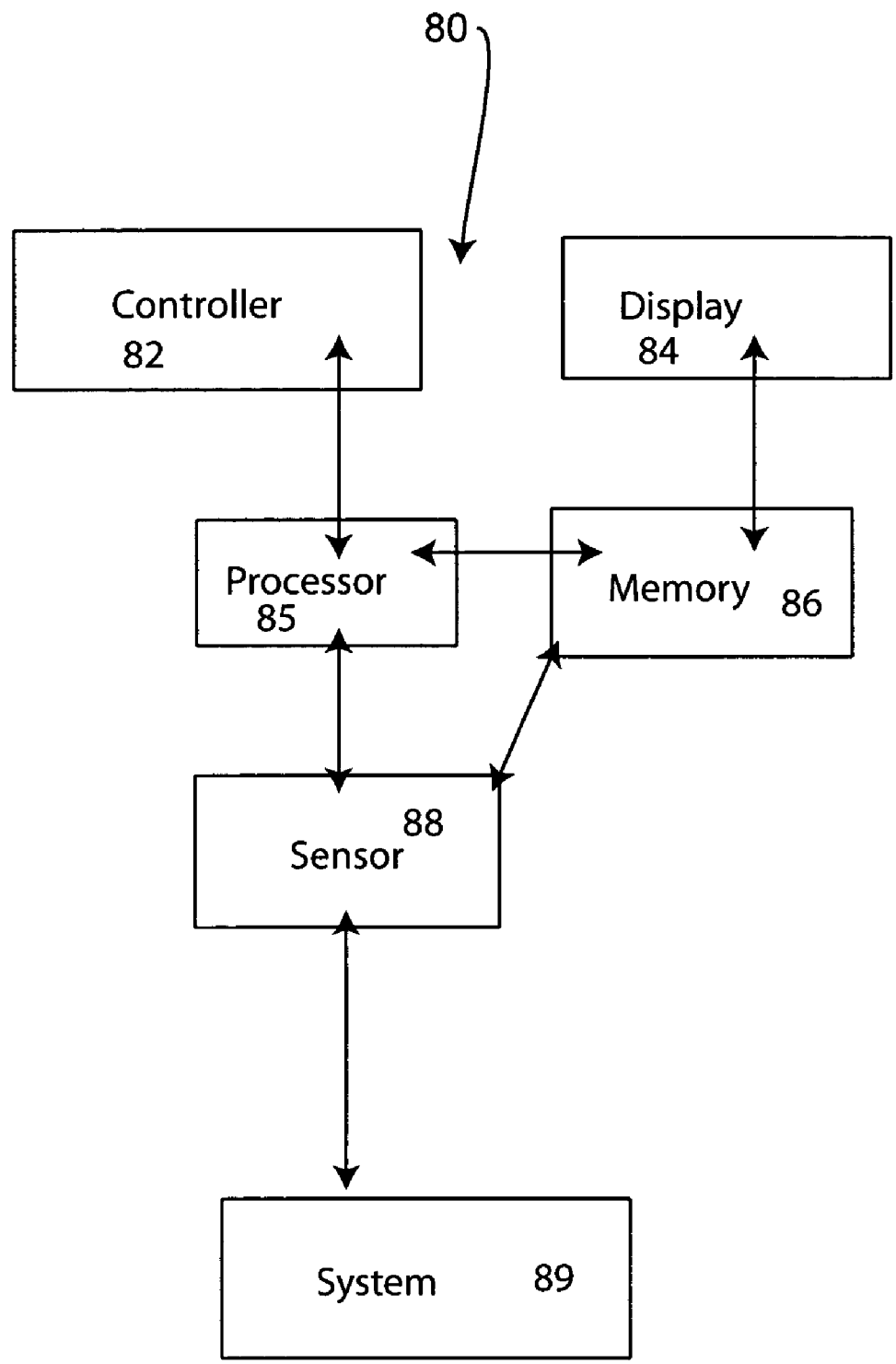
FIG. 6 shows a block diagram of a control system for the towing device.

FIG. 6 shows a block diagram for a controlling system 80 which can be used control stabilizing system 70 wherein controlling system includes a controller 82, a display 84, a processor 85, a memory 86, and a sensor 88. Essentially, controlling system 80 is used to control an input system 89 associated with stabilizing system 70. Controller 82 of controlling system 80 is used to receive input or feedback from a user which then allows this user to direct or control the release or extension of stabilizing system 70 and towing system 20. Controller 82 is in communication with processor 85 which along with a controlling program stored in memory 86 is used to control controller 80 and direct instructions to system 89. Memory 86 can be used to house this controlling program wherein memory 86 and processor 85 are in communication with display 84. Display 84 is used to display information relating to stabilizing system 70. Display 84 can be in the form of analog dials or a digital readout, displayed on for example a LCD screen.

A sensor 88 is in communication with processor 85 and memory 86 wherein processor 85 receives information from system 89 via sensor 88 and also from controller 82 to control the release and contraction of the towing device.

Sensor 88 can be in the form of a speed sensor which detects the speed of a towing device such as a water based vessel. This sensor can be in the form of a GPS based sensor that detects the change in global positioning to determine the speed across the water or in the form of a water flow sensor which detects the speed of the water past the vessel.

Alternatively, the sensor can be in the form of a pressure sensor, wherein the drag on the towing device is determined so that controller 82 can alternately release or draw-in the towed vessel depending on the drag associated with towing this vessel.

Figure 7A:
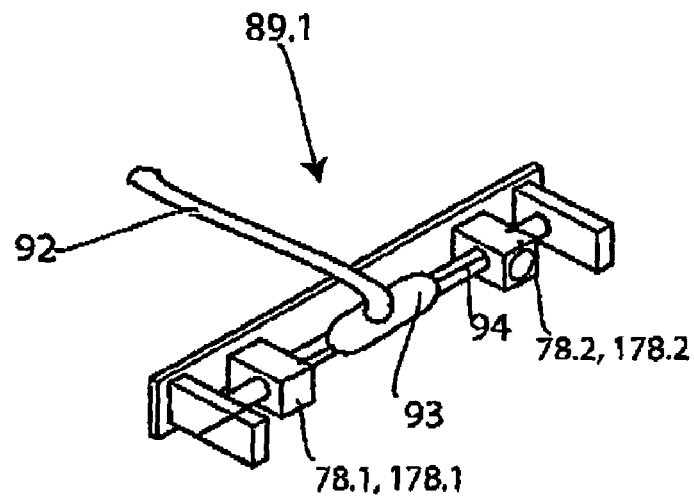
FIG. 7A shows a view of a hydraulic system applied to the stabilizer of the towing system.
Figure 7B:
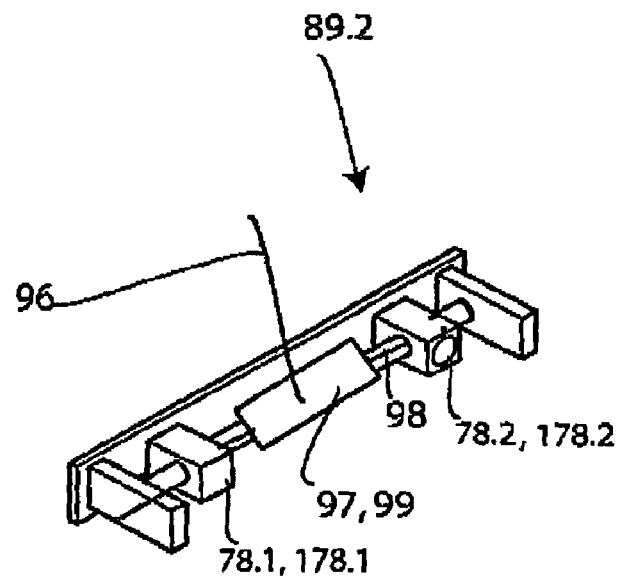
FIG. 7B shows a view of an electronic system for the stabilizer of the towing system.

FIGS. 7A and 7B show two other modified forms for controlling the angle α relating to the position of arms 22 and 23 on the device. In this case, FIG. 7A shows a hydraulic system 89.1 that can be controlled by control system 80 wherein hydraulic system 89.1 includes a hydraulic line 92 which feeds into a hydraulic stabilizer 93 for controlling the lateral movement of blocks 78.1 and 78.2 or blocks 178.1 and 178.2. As blocks 78.1 and 78.2, or blocks 178.1 and 178.2 move, they can change angle α wherein when blocks 78.1 and 78.2 or blocks 178.1 and 178.2 move together, angle α is reduced and the device 10 elongates as shown in FIG. 1A. Alternatively, hydraulic stabilizer can selectively move blocks 78.1 and 78.2 or blocks 178.1 and 178.2 out away from each other enlarging angle α causing the device to contract along longitudinal axis 21 as shown in FIG. 1B. In addition, in this position, the towing delivery system including slider system 60 is compacted together so that the entire system can be stored in storage container 16.

FIG. 7B discloses another system 89.2 which can include link 96 and a gas spring 97 in the form of a shock absorber which includes spreader bars 98 which are couple to associated blocks 78.1 and 78,.2 wherein this shock absorbers periodic loads from towing device being a boat. Alternatively, there can be a leaf spring system 99 which includes a leaf spring disposed inside of a housing wherein this leaf spring can be repeatedly loaded or compressed, or unloaded when towing a boat.

Accordingly, while a few embodiments of the present invention have been shown and described, it is to be understood that many changes and modifications may be made thereunto without departing from the spirit and scope of the invention as defined in the appended claims.

What is claimed is:

1. A towing device for towing watercraft comprising:
    a) a plurality of arms wherein each of said plurality of arms has a first end and a second end;
    b) at least one stabilizing bar coupled to a first end of at least one of said plurality of arms;
    c) a plurality of hinge connections disposed in a coupling connection between said plurality of arms in a region where said arms are coupled to each other, wherein said plurality of arms are coupled together in a rotatable manner and wherein at least one of said plurality of hinge connections also connect at a center connecting point between at least two of said plurality of arms wherein said plurality of arms rotate around said plurality of hinge connections to form a towing device that is adjustable in length; and
    d) a stabilizer in the form of a spring coupled to said stabilizing bar wherein said stabilizer selectively adjusts a position of at least one end of said plurality of arms.

2. The device as in claim 1, further comprising a plurality of coupling heads coupled in each of said first end and said second end of said plurality of arms.

3. The device as in claim 2, wherein said arms are formed as hollow arms, and wherein the device further comprises a screw element disposed inside of each of said arms, wherein said screw element is for allowing said plurality of coupling heads to be coupled to said plurality of arms.

4. The towing device as in claim 1, wherein said stabilizing bar is attachable to a towing device at a first end and for attaching to at least one end of at least two of said plurality of arms at an opposite end.

5. The device as in claim 1, wherein said spring is disposed between both of said at least one end of each of said at least two arms.

6. The device as in claim 5, wherein said spring is in the form of a spiral spring.

7. The device as in claim 5, wherein said spring is in the form of a leaf spring.

8. The device as in claim 5, wherein said spring in the form of a gas spring.

9. The device as in claim 1, wherein said stabilizer comprises at least two springs wherein said at least two springs coupled to said stabilizing bar.

10. The device as in claim 9, wherein said at least two springs are disposed outside of each of said at least one end of said at least two arms.

11. The device as in claim 1, wherein said stabilizer is in the form of a hydraulic stabilizing system, for adjusting a position of each of said at least one end of said at least two arms on said stabilizing bar.

12. The device as in claim 1, wherein said stabilizing further comprises a control system for setting a level for stabilization of said towing device.

13. The device as in claim 12, wherein said control system for said stabilizer is a hydraulic based control system.

14. The device as in claim 12, wherein said control system is an electronic control system.

15. The device as in claim 12, wherein said control system is in the form of a manual control system.

16. A device for towing watercraft wherein a towing vessel includes a swim platform having a storage bin, the towing device comprising:

a) a plurality of arms wherein each of said plurality of arms has a first end and a second end;

b) at least one crossbar coupled to a first end of at least one of said plurality of arms, and also coupled to the swim platform of the towing vessel; and c) a plurality of hinge connections disposed in a coupling connection between said plurality of arms in a region where said arms are coupled to each other wherein said plurality of arms are coupled together in a rotatable manner; wherein at least one of said plurality of hinge connections also connect at a center connection point between at least two of said plurality of arms wherein said plurality of arms rotate around said plurality of hinge connections to form a towing device that is adjustable in length; and wherein said plurality of arms are collapsible inside of the switch platform of the towing vessel.

17. The device as in claim 16, further comprising an extendable platform slidably connected to the swim platform of the towing vessel, and also coupled to said at least one crossbar.

18. The device as in claim 17, further comprising a plurality of rails coupled to the swim platform, wherein said extendable platform is slidable on said plurality of rails on the swim platforms.

* * * * *